Jan. 19, 1954 R. J. KIRCHER 2,666,812

TELEPHONE SIGNALING SYSTEM

Filed Oct. 24, 1951

INVENTOR
R. J. KIRCHER
BY R. O. Covell
ATTORNEY

Patented Jan. 19, 1954 2,666,812

UNITED STATES PATENT OFFICE 2,666,812

TELEPHONE SIGNALING SYSTEM

Reymond J. Kircher, Summit, N. J., assignor to Bell Telephone Laboratories, Incorporated, New York, N. Y., a corporation of New York Application October 24, 1951, Serial No. 252,881

5 Claims. (Cl. 179—86)

Figures 1, 2, 3:
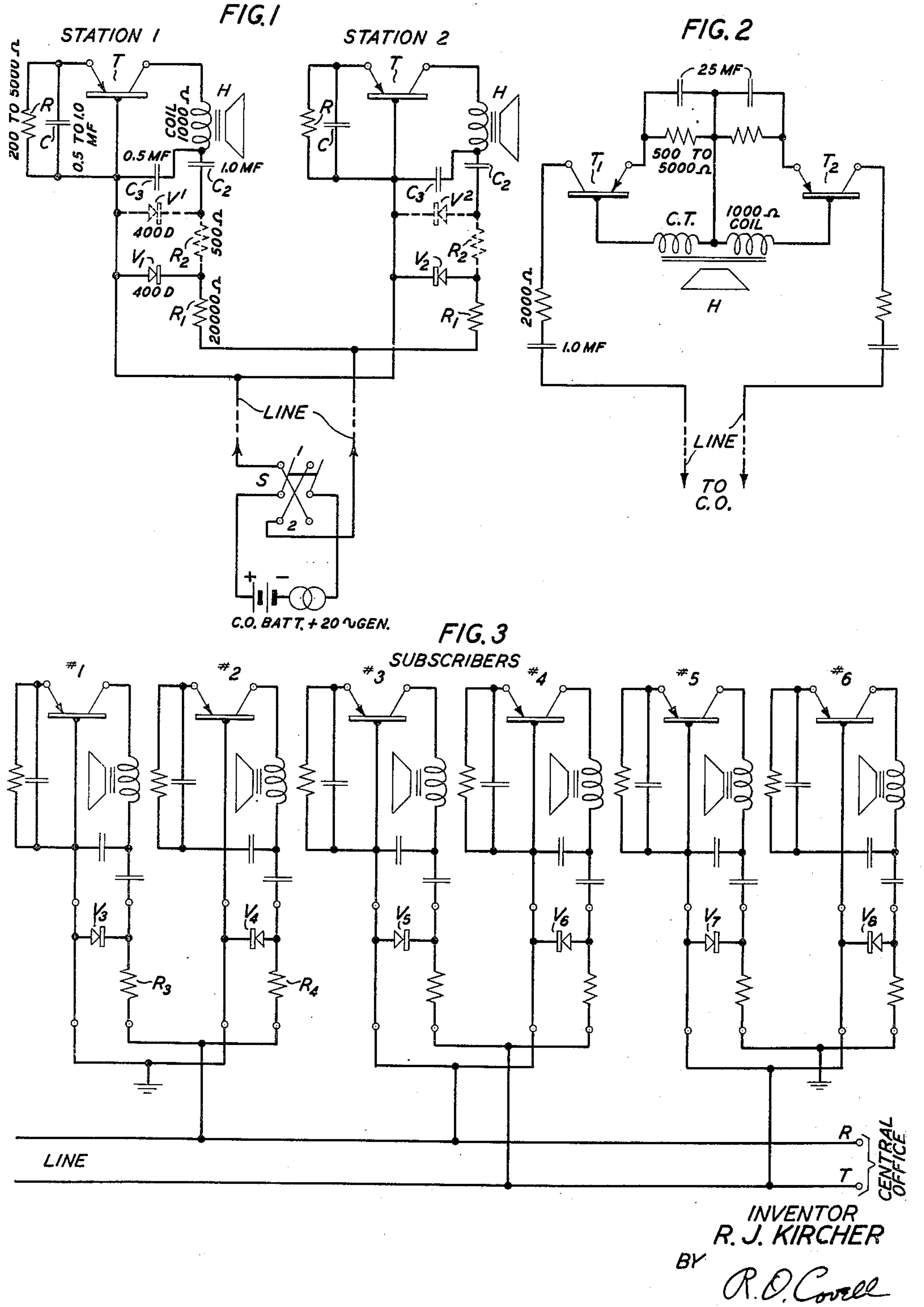

This invention relates to station signaling systems and more particularly to improved means for telephone station signaling.

One of the objects of the invention is to provide an improved telephone station signaling circuit employing new circuit elements of compact size, economical construction, and low current consumption with very long life of service.

Another object of the invention is to provide a suitable calling signal at a telephone subscriber's station without the use of a bell or gas discharge activated gong-type ringer.

A further object of the invention is to provide an improved multiparty selective signaling system.

A further object of the invention is to provide means for producing an audible signal comprising tones in the audio frequency range, in particular of from 400 to 600 cycles per second, at an acoustic level of approximately 25 microwatts, by means which are energized solely by low frequency signaling current such as the conventional 20-cycle telephone ringing supply or even, if desired, by the direct-current battery supply.

Still another object is to provide in such a system two-party full selective signaling over an all-metallic circuit.

The invention resides in novel circuit combinations by which three electrode semiconductor devices, now known generally as transistors, are employed in telephone subscribers' station circuits, in combination with an electroacoustical transducer as means for producing a suitable audible signal by which the subscriber's attention is attracted when his station is called.

Three embodiments of the invention are disclosed by the accompanying drawings in which:

Fig. 1 represents the signaling portions of two stations connected by a common line to a central office battery and 20-cycle generator through switching means by which battery polarity on the line may be reversed;

Fig. 2 represents an alternative arrangement in which a single station is provided with two transistor oscillators connected in push-pull to an electroacoustical transducer, by which arrangement a greater power and more constant and musical frequency of signal tone radiation may be attained; and Fig. 3 represents the ringing portions of six stations according to the invention which are connected to a common line, with a ground connection at four of the stations, whereby full selective signaling of any one of the stations may be attained.

To simplify the disclosure of the invention the talking portions of the several telephone stations illustrated in the drawings have been omitted and only the signaling portions of the circuit at each station are disclosed. Although the invention is not limited to telephone use but may be employed simply for remote station signaling, it will be obvious to those familiar with the telephone art that speech transmitting and receiving apparatus may be added to the station circuit illustrated in the drawings, in a manner which is well known in the art, and that any one of many well-known types of telephone station sets may be employed. A preferred telephone talking circuit which may be employed with the station signaling circuits of the invention is disclosed by a pending application of H. F. Hopkins, Serial No. 202,887, filed December 27, 1950, now Patent No. 2,629,783. A preferred form of telephone station set for use with the invention is disclosed by the copending application of E. E. Mott Serial No. 107,300 filed July 28, 1949, now Patent No. 2,578,367.

Detailed reference is now made to Fig. 1 of the drawing which illustrates the invention adapted to a two-party ringing circuit with provision for full selective signaling of either party. The two stations in Fig. 1, designated station 1 and station 2, are connected by the common line L through a double pole double throw switch S at the central office to a 20-cycle ringing generator in series with a direct-current battery supply. The polarity of signal applied to the line may be reversed by operation of switch S. In series with the line at each station is a fixed resistance $R_1$ which in the preferred embodiment may have a value of approximately 10,000 to 20,000 ohms. Across the line at each station is connected a diode rectifier, $V_1$ at station 1 and $V_2$ at station 2. It will be noted that $V_1$ at station 1 is oppositely poled from $V_2$ at station 2 in such manner that the circuit of each station presents a high impedance to direct current of one polarity and a low impedance to current of the opposite polarity. With this arrangement it is apparent that station 1 is enabled for ringing when the direct-current polarity of the line is such as to operate the rectifier of this station at a bias which results in a very high value of shunting resistance across the line. With this same polarity on the line station 2 is disabled since its rectifier $V_2$, in opposite polarity across the line, is biased in the lower resistance condition, and effectively shunts the ringing circuit at station 2 from the line.

Shown in dotted lines in series with the ringing circuit at each station is another resistance $R_2$, which may have a value of approximately 500 ohms, with a second shunting rectifier, V' at station 1 and $V^2$ at station 2, which may be employed if desired to effect more complete shunting of each station in one condition. This use of two rectifiers in parallel across the line and two resistors in series with the line results in a very high degree of attenuation to ringing voltage at the unwanted station when the opposite station is rung, so that no false ringing of the transistor oscillator at the unwanted station can occur. The use of the additional shunting circuits shown in dotted lines in Fig. 1 may only be necessary on party lines where a high level of noise may be present or where unusually high transient disturbances may be encountered or very high value of ringing voltage is available. In order to ring station 2 rather than station 1 the direct-current polarity of the line is reversed at the central office by such means as the switch S to transmit oppositely poled direct current over the line.

The remaining portion of the station ringing circuit comprises at each station a three-electrode semiconductor device T which in the preferred embodiment is a type A transistor, the base electrode of which is connected to one side of the line, the emitter electrode of which is connected through a resistance capacitance network RC to the same side of the line, and the collector electrode of which is connected through the driving coil of an electromagnetic transducer H in series with a series condenser $C_2$ to the opposite side of the line. As noted in the drawing typical values for these components are a resistance of from 200 to 500 ohms (which may in fact be as high as 5000 ohms in special cases) for resistor R, a capacitance of .5 to one microfarad (or of this order) for condenser C, and a capacitance of the order of one microfarad for series condenser $C_2$. The circuit at each station is completed by a shunt capacitor $C_3$, which may have a capacitance of approximately .5 microfarad, connected across the line at each station as illustrated by Fig. 1 of the drawing.

Of course, those familiar with the art will appreciate that other forms of the transistor devices may be similarly utilized by appropriate changes in the values of circuit elements. Thus a junction type transistor may be employed instead of the point type illustrated by the drawing, or a transistor made from P-type germanium may be used instead of one made from N-type germanium. Also, it may be found advantageous under some circumstances to insert an auxiliary resistance (not shown in the drawing) in series with the base lead of the transistor. Such auxiliary base lead resistance may be of the order of 1000 ohms.

Energization of the subscriber's station circuit is accomplished by 20-cycle ringing current superimposed on direct-current battery from the central office. This causes the circuit to oscillate at a frequency which is determined by the constants of the various components. With the typical values disclosed herein, the circuit oscillates at a frequency of approximately 500 cycles per second. Through the action of the transistor, which serves as an oscillator providing self-rectification for self-biasing, oscillations of large amplitude appear across the selector circuit, and drive the acoustical horn, H, which may be formed from a ring armature type telephone receiver in the manner disclosed by copending application of E. E. Mott Serial No. 107,300 filed July 28, 1949.

For a more detailed description of the manner in which a transistor generally functions as an oscillator when connected in a circuit like that of the drawing, reference may be had to the teaching of L. A. Meacham in Patent 2,556,286 which issued June 12, 1951. One feature of the present oscillator circuit which distinguishes it from the multivibrator transistor oscillators of the Meacham patent is the use of the inductance of an armature coil in the collector circuit instead of employing a resistive element. The use of inductive reactance in this portion of the circuit has been found on both an experimental and theoretical basis to contribute the property of very markedly lowering the frequency of multivibrator oscillation as compared to the frequency resulting from the use of a resistance at this point of the circuit, as taught by Meacham. As stated above, the particular inductive reactance used in the preferred embodiment of the invention is a standard telephone headset armature coil which, in conjunction with the condenser and resistance network of the emitter circuit, establishes in a non-critical manner the frequency of oscillation for the ringing oscillator circuit. As noted in the drawing, the coil of this horn radiator has a direct-current resistance of only 1000 ohms, whereas the transistor multivibrator circuits heretofore disclosed have generally required a collector load resistance of 5000 ohms or more. The use of this low resistance horn coil in series with condenser $C_2$ produces a load of sufficiently high impedance to enable the transistor to operate efficiently while at the same time affording means for effectively coupling the output of the transistor to the relatively low impedance magnetic horn. The resulting audible frequency which is emanated by the horn has a fundamental frequency of approximately 500 cycles per second enriched by many overtones which give the signals an insistent quality. This sound carries greater distances and may be heard by more persons, including those whose hearing is slightly impaired, than is the case with the present gong-type bell ringers which produce a higher pitched sound.

Reference is now made to Fig. 2 of the drawing which discloses an alternative arrangement of the invention adapted for private party ringing and employing two transistors connected in a circuit which forms an oscillator operating in push-pull driving a single electromagnetic horn H, which may be a ring armature receiver as disclosed in Fig. 1, with the addition of a center connection to its driving coil as illustrated in the circuit of Fig. 2. Typical values for components of this circuit are given in the drawing of Fig. 2, although it is to be understood that reasonable variations thereof may be made by those skilled in the art. Although it is generally desirable that the value of resistors and capacitors on corresponding sides of the push-pull circuit of Fig. 2 should have the same value, the values of the circuit elements may be adjusted somewhat in order to bring both transistors to approximately the same frequency of oscillation. This is desirable to produce a more pleasant sound radiation from the acoustical horn H. Although the arrangement of Fig. 2 is not adapted to selective signaling as is required in party line service and as is provided by the circuit of Fig. 1, the push-pull transistor oscillators of Fig. 2 afford the advantage of producing a higher level sound radiation from the horn transducer H; and, when the frequency of the two oscillators is properly balanced, this higher level signal contains fewer harmonic overtones than are produced by a single oscillator, and therefore results in a purer tone of sound radiation which may be considered to be more pleasant.

Reference is now made to the circuit of Fig. 3 which discloses the manner in which the invention may be adapted to full selective signaling of six party stations on a common line. Here it will be noted that the oscillatory circuit at each party station is substantially identical to that shown in Fig. 1. To simplify the drawing of Fig. 3 only a single diode rectifier has been shown across the line at each station, as illustrated by $V_3$ at station 1 and $V_4$ at station 2, preceded by a single line resistor, $R_3$ and $R_4$ respectively, at each station. However it is to be understood that an additional shunt rectifier and series resistor may be provided at each station, in the manner shown by the dotted lines in Fig. 1, wherever such an arrangement may be found desirable to prevent false signaling of stations on a line which is subject to a high level of noise or excessive transient disturbances. It will be noted that the arrangement of Fig. 3 requires the use of a ground connection for four of the six stations illustrated. Thus the circuit of Fig. 3 is essentially an extension of the arrangement of Fig. 1 in which stations 1 and 2 having oppositely poled shunt rectifiers $V_3$ and $V_4$ are connected between the ring conductor of the line and ground; stations 3 and 4 which also have oppositely poled shunt rectifiers $V_5$ and $V_6$, are connected to the tip and ring conductors of the line; and stations 5 and 6, also having oppositely poled shunt rectifiers $V_7$ and $V_8$, are connected between the tip conductor and ground. With this arrangement station 1 is signaled by applying 20-cycle ringing current superimposed on positively poled central office battery between the ring conductor and ground; station 2 is signaled by reversing the polarity of ringing current over the same connection between ring and ground; station 3 is signaled by positively polarized ringing current applied to the tip and ring conductors of the line; station 4 is signaled by reversing the polarity of ringing signals across the tip and ring conductors; station 5 is signaled by positively poled ringing current applied between the tip conductor of the line and ground, and station 6 is signaled by reversing polarity of the ringing current between tip conductor and ground. In this way as many as six stations may be served with full selective signaling over a common line. It will be obvious to those skilled in the art that telephone transmitting and receiving circuits may be added to the station signaling circuit of Fig. 3, just as may be done with the station signaling circuit of Fig. 1 and Fig. 2, for employing the invention in telephone systems.

It is to be understood that the invention is not limited to the specific circuits of the preferred embodiments herein disclosed but that many variations in circuits may be made within the scope of the invention by those skilled in the art. For example, the invention is not restricted to the use of the 20-cycle ringing signal superimposed upon central office battery but may employ signals of other frequencies, either higher or lower, or, if desired, even simple direct-current battery source may be employed without the superimposition of any alternating-current signal. Indeed, if pure direct current is used for signaling, somewhat richer fundamental tones may be generated by the oscillatory circuit at the called station to produce more pleasing sounds from the acoustical transducer. For direct-current signaling the condensers $C_2$ of Fig. 1, and corresponding line condensers of Fig. 2 and Fig. 3, would be eliminated from the station circuits. However, the arrangement herein disclosed is considered preferable because 20-cycle ringing current is now generally provided in all telephone offices and therefore the preferred arrangement disclosed may be readily adapted to existing telephone plant facilities.

What is claimed is:

1. A station signaling system comprising a central office and a station to be signaled, a source of electrical energy at said office, a line connecting said station with said office, a semiconductor oscillator at said station whose frequency of oscillation is totally independent of the frequency of said electrical energy and is determined solely by the circuit parameters in said oscillator circuit, said oscillator being connected to said line, an electroacoustical transducer at said station connected with said oscillator, and means at said office for applying said electrical energy to said line whereby the semiconductor oscillator at said station is energized to operate said acoustical transducer.

2. A telephone station calling system comprising a central office and a plurality of subscribers' stations connected therewith, a source of signaling voltage at said office and means for transmitting said voltage to any of said stations to be called, means at each of said subscribers' stations including a transistor oscillator circuit adapted when energized by said signalling voltage to generate oscillatory currents the frequency of which is determined solely by the circuit parameters in said oscillator circuit and is totally independent of the frequency of said signaling voltage and an acoustical horn transducer at each of said stations connected with said transistor oscillator thereat in a manner to be energized by the oscillatory currents generated by said transistor.

3. A multiparty station signaling system comprising a central office and a plurality of outlying stations connected therewith, certain of said stations connected with said office by a party line, a source of alternating signal voltage in combination with a direct-current battery at said office, means at said office for applying said combination alternating and direct-current signal voltages to said party line, further means at said office for reversing the polarity of said direct-current battery, a semiconductor oscillator circuit in combination with an electroacoustical transducer at each of said party line stations, unidirectional current devices connected across the line at each station in a manner to present a high impedance to current of one polarity and a low impedance to current of the opposite polarity, the polarization of said device at one station being opposite to that at another station whereby upon the application of said combined alternating and direct-current signal voltages to said party line, the semiconductor oscillator at a first one of said stations is energized to operate said electroacoustic transducer thereat, while a second party station on said line is shunted by the low impedance by the oppositely polarized unidirectional current device thereat, and upon reversal of said battery polarity at said office said first station circuit is shunted and the semiconductor oscillator at said second party station is energized to operate the electroacoustic transducer thereat.

4. In a multiparty station signaling system comprising a central office and a plurality of outlying stations connected therewith by a party line, a source of alternating signal voltage in combination with a direct-current battery at said office, an oscillator circuit at each station whose frequency of oscillation is independent of the frequency of said signal voltage and is determined solely by the circuit parameters of said oscillator circuit, an electroacoustical transducer at each of said stations connected with said oscillator circuit in a manner so as to be energized by the oscillatory currents generated in said oscillator circuit, means connected across the line at each station so as to present a high impedance to voltage of one polarity and a low impedance to voltage of the opposite polarity, the polarization of said last named means at one-half of said stations being opposite to that at the other half of said stations, means for applying signaling voltage of one polarity to said line so as to energize the oscillator circuit and transducer at only one-half of said stations, means for applying signal voltage of the opposite polarity from said last name signal voltage to said line so as to energize the oscillator circuit and transducer at the other half of said stations.

5. In a telephone signaling system a central office, a pair of wires comprising a telephone line, a first pair of subscriber stations connected in parallel but in opposite polarity between one wire of said line and an earth ground, a second pair of subscriber stations connected in parallel but in opposite polarity between the other wire of said line and an earth ground, a third pair of subscriber stations connected in parallel but in opposite polarity across the two wires of said line, an oscillator at each station whose frequency of oscillation is determined only by the circuit parameters of said oscillator circuit, an electroacoustical transducer at each station connected to a said oscillator circuit in a manner so as to be energized by the oscillatory current generated in said oscillator circuit, means at each station for rendering each oscillator circuit responsive only to signal voltages of one polarity, said last named means being so connected so as to make the oscillator circuit in one subscriber station in each pair responsive to a signal voltage of the opposite polarity from the signal voltage to which the other station in the same pair is responsive, means at said office for selectively applying a signal voltage of a certain polarity to said line to actuate only the oscillator circuit and transducer in the one station desired.

REYMOND J. KIRCHER.

References Cited in the file of this patent

UNITED STATES PATENTS

| Number | Name | Date |
|---|---|---|
| 1,495,295 | Fletcher | May 27, 1924 |
| 2,452,239 | Huge | Oct. 26, 1948 |
| 2,556,286 | Meacham | June 12, 1951 |
| 2,589,800 | Goodage et al. | Mar. 18, 1952 |